US011529706B2

(12) United States Patent
Cimadevilla García et al.

(10) Patent No.: US 11,529,706 B2
(45) Date of Patent: Dec. 20, 2022

(54) METHOD OF ALIGNING HARDPOINTS IN AERONAUTICAL STRUCTURES

(71) Applicant: ACITURRI ENGINEERING S.L.U., Valladolid (ES)

(72) Inventors: David Cimadevilla García, Valladolid (ES); Adrian Barcina Benito, Valladolid (ES); Javier Palacios Martínez, Valladolid (ES)

(73) Assignee: ACITURRI ENGINEERING S.L.U., Boecillo (ES)

( * ) Notice: Subject to any disclaimer, the term of this patent is extended or adjusted under 35 U.S.C. 154(b) by 0 days.

(21) Appl. No.: 17/305,278

(22) Filed: Jul. 2, 2021

(65) Prior Publication Data

US 2021/0323105 A1    Oct. 21, 2021

Related U.S. Application Data

(62) Division of application No. 16/669,885, filed on Oct. 31, 2019, now Pat. No. 11,179,819.

(30) Foreign Application Priority Data

Oct. 31, 2018 (EP) .................................... 18382768

(51) Int. Cl.
 *B23P 19/10* (2006.01)
 *B64F 5/10* (2017.01)
(52) U.S. Cl.
 CPC ............... *B23P 19/10* (2013.01); *B64F 5/10* (2017.01)
(58) Field of Classification Search
 CPC .............. B23P 19/10; B64F 5/10; Y02P 70/50
 See application file for complete search history.

(56) References Cited

U.S. PATENT DOCUMENTS

2019/0270527 A1 *  9/2019  Cimadevilla García . B64F 5/10
2021/0354850 A1 * 11/2021  Nelson ...................... B64C 1/10

FOREIGN PATENT DOCUMENTS

| DE | 102006019917 A1 | 11/2007 | |
| EP | 2781453 A1 | 9/2014 | |
| EP | 3533716 A1 | 1/2018 | |
| EP | 3533716 A1 * | 9/2019 | ................ B64F 5/10 |

(Continued)

OTHER PUBLICATIONS

European Search Report issued in corresponding European patent application No. 18382768, dated Mar. 11, 2019.

*Primary Examiner* — Rick K Chang
(74) *Attorney, Agent, or Firm* — Westman, Champlin & Koehler, P.A.

(57) ABSTRACT

The present disclosure relates to a method of assembling hardpoints in aeronautical structures, and more specifically, the disclosed method allows knowing the relative deviation of the hardpoints and of the positioning elements of the hardpoints with respect to a laser beam emitted by a laser collimator fixed to an adjustable support which can be adjusted in at least two directions in space, and by using a correction algorithm, it is possible to know the displacement necessary for locating the positioning elements such that they are aligned with respect to the hardpoints, the positioning elements in turn being moved as a result of the movement of the driven linear tables in one or in several iterative steps, at which time the position thereof is fixed and they are ready for the rest of the hardpoints to be assembled.

4 Claims, 8 Drawing Sheets

(56) References Cited

FOREIGN PATENT DOCUMENTS

| FR | 2821778 A1 | 9/2002 |
|----|------------|--------|
| GB | 2473100 A | 3/2011 |
| WO | 2013/117971 A1 | 8/2013 |

* cited by examiner

METHOD OF ALIGNING HARDPOINTS IN AERONAUTICAL STRUCTURES

CROSS-REFERENCE TO RELATED APPLICATION(S)

This application is a divisional of application Ser. No. 16/669,885, filed Oct. 31, 2019 and further claims priority to European Patent Application n° 18382768.2 filed on Oct. 31, 2018, in English, the entire contents of which are hereby incorporated by reference.

FIELD OF THE INVENTION

The method described in the invention follows the philosophy commonly referred to as adaptive tooling, which strives for a flexible tooling that is suited to assembly circumstances and requirements for aeronautical structure.

More specifically, the present invention relates to a method for assembling hardpoints that need to be aligned with one another in an aeronautical structure in a very accurate manner, where hardpoints are understood to refer to those crucially important structural parts in which other structures are assembled and through which there passes the entire, or almost the entire structural load of the assembled element, for example the attachment fittings of the elevators or rudders, ailerons, spoilers, etc.

BACKGROUND OF THE INVENTION

The enormous increase in air traffic in recent years is well known, making air traffic a common means of transport for a large part of the population. This has led to a considerable increase in the demand for new aircraft both for offering new lines or services and for reinforcing existing lines or services, as well as to the need to renovate fleets to replace old and/or rather inefficient or non-cost effective aircraft.

The extremely high cost of manufacturing these aircraft is also very well known, and for such manufacture, a quite significant part is used in assembly operations, so for some time now there has been a need in the aeronautical industry to reduce those expenses for the purpose of improving their competitiveness.

Furthermore, for the aeronautical industry this problem is compounded by the requirement of high accuracy levels. For this reason, due to the complexity and the number of elements the end products have, the inaccuracies and deviations that build up during the processes for manufacturing the fundamental parts as they are gradually integrated into sub-assemblies until forming the aircrafts become particularly important.

These deviations often lead to the need to modify parts or change the assembly process in situ in a recurring manner to enable finishing the product, causing extremely high cost overruns and delays and rendering the costs associated with those non-conformities present in aeronautical structure assembly operations the highest of all.

Some time ago, a first attempt to alleviate these problems consisted of proposing improvements to the design, process, and tooling, in which intrinsic inaccuracies of the processes were absorbed during assembly.

For example, in the case of jigs, the first systems were based on building platforms made up of fixed devices which supported the components and acted like auxiliary assembly aid elements, where each portion of the structure of the aircraft had its own jig elements in what was known as a "dedicated tooling." This system, however, required a lot of time and a high cost both in terms of manufacture and modification or rectification of the various elements of the jig or "master" tools as they were true pieces of craftsmanship.

After that, for the purpose of reducing costs the so-called "modular tooling" came about, which used standardized profiles to build the different jigs, making it possible to recycle parts, and since these parts were not welded, they could be adjusted and therefore provide certain flexibility when designing said jig. This system, which is based on modularity in order to obtain the flexibility that is sought, basically consisted of creating a group of standard parts to which different portions are fixed by means of also standard nuts and bolts, and as a result of different grooves it also allowed fitting them in different positions. Furthermore, said parts were often recyclable, which allowed them to be reusable in subsequent assemblies. Nevertheless, although this technique improved the results of earlier techniques, its cost still left a lot of room for improvement.

More recently, with the rise of three-dimensional laser measuring equipment, such as that commonly referred to as laser trackers, master tools gave way to the in situ calibration of the jig with accuracies of up to 10 microns. Nevertheless, these systems also suffer from the drawback of lacking any flexibility whatsoever, given that in order to change the positions of the devices, a laser tracker is required for getting them ready with accuracy, however this equipment is too expensive and the process for getting them ready takes too long to do in each manufacturing process.

Also with the rise of guided robots (vision-guided, laser-guided, etc.), flexible manufacturing processes can be carried out today with accuracy. Nevertheless, the cost of paying off the robot is once again a significant economic barrier, particularly in the case of the aerospace industry where the manufacturing output is lower compared to other industries, such as the automotive industry, for example.

So for the purpose of overcoming the aforementioned drawbacks, there are essentially two techniques today that employ a different philosophy but pursue the same objective, i.e., making assembly processes as flexible as possible such that such processes adjust or adapt to the changing circumstances of production without affecting product quality and at a competitive cost in terms of both material and time.

One of these techniques is referred to as a jigless technique, i.e., one without a jig, which pursues, as its own name indicates, the complete elimination or the most complete elimination possible of the jig.

The main advantage of this technique is the considerable savings in material costs, and also the savings in time. Furthermore, extremely high levels of accuracy can be achieved in the case of applying laser techniques such as the technique described in patent document EP18382127, belonging to the present applicant.

Said technique, however, also suffers from the drawback that, since it is not equipped with a jig, the aeronautical structure is assembled on itself, which sometimes hinders accuracy due to the fact that the absence of rigidity does not allow performing the final tasks for attaching the different elements, such as drilling, riveting, etc., with the required accuracy. In other words, although the method allows for very good adaptability to the product and although very high accuracy is achieved during the first assembly phase, said accuracy may be diminished in the final operations.

The other alternative technique with respect to not using a jig or the jigless technique which achieves said adaptability despite using a jig is referred to as adaptive tooling, which pursues the dual purpose of absorbing deviations of the assemblies and adjusting to circumstances for the purpose of lowering costs, but without this affecting final product accuracy/quality.

SUMMARY

The method of the present invention belongs to those techniques referred to as adaptive tooling techniques, but it solves the problems of the prior art given that the position of the different assembly tools or elements making up the jig theoretically is not predetermined, but rather is determined by the position of other parts already previously assembled during the assembly process.

Furthermore, given that a jig is used, the method of the present invention has the advantage with respect to the technique in which a jib is not used, referred to as a jigless technique, in that it has rigid points that allow performing the last drilling and/or riveting operations of the assembly with maximum accuracy.

In other words, the disclosed method makes the jig used during the assembly adaptive, which translates into a larger number of compliant products, and therefore into cost savings. Specifically, given that the disclosed method is based on making the jig adaptive, i.e., flexible when being positioned, compliance of the final assembly is achieved in some cases in which the elements making up said assembly could be considered non-compliant as they are outside certain tolerance limits if they were assembled by means of other assembly techniques or methods that do not allow said flexibility.

The invention now described generally consists of a method based on the use of a laser positioning device for marking the position in which said assembly tools or elements making up the jig must be placed, either automatically or manually, in order for them to be aligned. Therefore, said laser positioning devices allow positioning in an accurate and flexible manner the hardpoints of an aerostructure aligned with other parts of the assembly that have previously been assembled in the structure.

In other words, the disclosed method is based on the use of a laser system that allows aligning different tooling devices in an accurate manner for the subsequent attachment thereof to the rest of the structure to be assembled.

The disclosed method is, therefore, suitable for carrying out the alignment and assembly of mobile aeronautical structures, i.e., structures that interact with the air and allow changing said form of interaction, such as control surfaces, for example: ailerons, elevators or rudders, or any other structure requiring the alignment of its hardpoints with a very narrow tolerance.

On the other hand, the disclosed method needs an auxiliary structure as a support which allows positioning the different parts or sub-assemblies making up the structure to be assembled for the correct assembly thereof, i.e., the assembly tool for the structure at hand which comprises:
   positioning devices or positioning elements for the hardpoints, where said positioning devices allow restricting one or several degrees of freedom of a part or sub-assembly of parts, such that the proper positioning thereof with respect to the others is assured; and
   a structure for supporting the structure to be assembled and the positioning devices themselves in a sufficiently rigid manner.
And additionally the following elements:
   a collimator equipment or a laser beam emitter;
   an adjustable support for the laser collimator;
   at least one coaxiality sensor capable of detecting the incidence of the laser beam on its surface and knowing its position with respect to a reference system in the device itself; i.e., a sensor which allows measuring the relative deviation of the laser beam emitted by the collimator with respect to the sensor itself;
   2-axis driven linear tables which consist of supports with one or more linear guides or tracks which allow displacing one element with respect to another, that is, they specifically allow displacement in two perpendicular directions, and therefore on one plane;
   mechanical actuators or devices the function of which is to provide force for moving the driven linear tables and which can be operated by hand or, for example, by an electric motor; and
   a computer system connected to both the coaxiality sensors and the actuators so as to interact with them and, through an interface, allow the user to perform the drive and direct the method and obtain information useful for the development of said method.

More specifically, the laser collimator is assembled on a support and is adjusted such that the beam it emits goes through the holes of the fixed hardpoints previously installed in the structure. Therefore, the driven linear tables are driven precisely because the actuators are connected thereto. These driven linear tables are coupled to the positioning elements, thereby obtaining control over the movement thereof. Finally, the coaxiality sensors are installed in the fixed hardpoints and in the positioning elements such that the laser beam strikes them and the deviation of said laser beam with respect to the coaxiality sensors, and vice versa, can thereby be known.

Therefore, as a result of the preceding configuration the relative deviation of the fixed hardpoints and of the positioning elements with respect to the laser beam is known, and by using a correction algorithm, it is possible to know the displacement necessary for locating the positioning elements such that they are aligned with respect to the fixed hardpoints, said positioning elements being moved in turn as a result of the movement of the driven linear tables. Specifically, by means of the movement of the driven linear tables, in one or in several iterative steps, the positioning elements are located until being aligned with the fixed hardpoints, at which time the position thereof is fixed and they are ready for the assembly of the rest of the hardpoints.

As described above, the method of the invention thereby allows an assembly tool to adapt its position to the product or structure to be assembled, improving the accuracy of the alignment of the hardpoints that is achieved with a conventional tool and without such high costs as those involved with a guided robot.

Having said the foregoing, the steps comprised in the disclosed method are described for a particular product, for example one of those products mentioned above, once it is fixed on the auxiliary or supporting structure and is equipped with two hardpoints assembled in a preceding step with another assembly tool, and said steps are the following:
   1) INSTALLING AND ADJUSTING THE LASER COLLIMATOR. In this step, the laser collimator is assembled in its support and adjusted so that it goes through the through holes with which the already installed hardpoints and the positioning elements are equipped. It should be pointed out that it is not necessary for the laser beam to go through the exact center of said holes, since it is sufficient for it to be within the reading range of the coaxiality sensor, which is usually several millimeters.

2) COUPLING THE COAXIALITY SENSOR OR SENSORS. The sensor is coupled (if a sequential measurement is taken one by one) or the coaxiality sensors are coupled (if the measurement is simultaneous) to the hole of the already installed hardpoints and of the positioning elements.
3) MEASURING HARDPOINTS AND POSITIONING ELEMENTS. The laser beam strikes the coaxiality sensor or sensors located in the hardpoints and in the positioning elements, showing their deviation with respect to the local reference system of said coaxiality sensors.
4) CALCULATING THE DISPLACEMENT OF THE POSITIONING ELEMENTS. Once the deviations with respect to the laser beam are known, the correction algorithm is applied to calculate the necessary displacements to which the positioning elements are to be subjected for proper alignment of the hardpoints.
5) MOVING THE POSITIONING ELEMENTS. The driven linear tables perform horizontal and vertical displacements equivalent to those displacements calculated in the preceding paragraph, resulting in the positioning element being positioned such that it is aligned.
6) CHECKING THE POSITIONING ELEMENTS. A new reading of the new position of the positioning elements according to paragraph 3 above is taken, and in the event of being considered unsuitable, a new calculation of the displacement of the positioning elements is performed by repeating steps 4 and 5.
7) FIXING THE POSITIONING ELEMENTS. Once it is checked that the alignment between fixed hardpoints and positioning elements is good enough, the position of the actuators and therefore of the positioning elements is locked.
8) ASSEMBLING THE REST OF THE HARDPOINTS. After that point, the coaxiality sensor or sensors are disassembled and the rest of the points are assembled as if it were a conventional jig, i.e., by means of the known operations of drilling, sealing, riveting, etc., and additionally
9) VERIFYING HARDPOINTS. The present invention also allows verifying the final alignment of the hardpoints with accuracy, for which purpose the coaxiality sensor or sensors must simply be coupled to the hardpoints with different adapter sockets and the calculation must be performed in the same way as with the positioning elements.

The present summary is provided only by way of example, and not limitation. Other aspects of the present invention will be appreciated in view of the entirety of the present disclosure, including the entire text, claims and accompanying figures.

DESCRIPTION OF THE DRAWINGS

To complement the description that is being made and for the purpose of helping to better understand the features of the invention, a set of drawings is attached to the present specification as an integral part thereof, in which the following is depicted in an illustrative and non-limiting manner.

Figure 1:
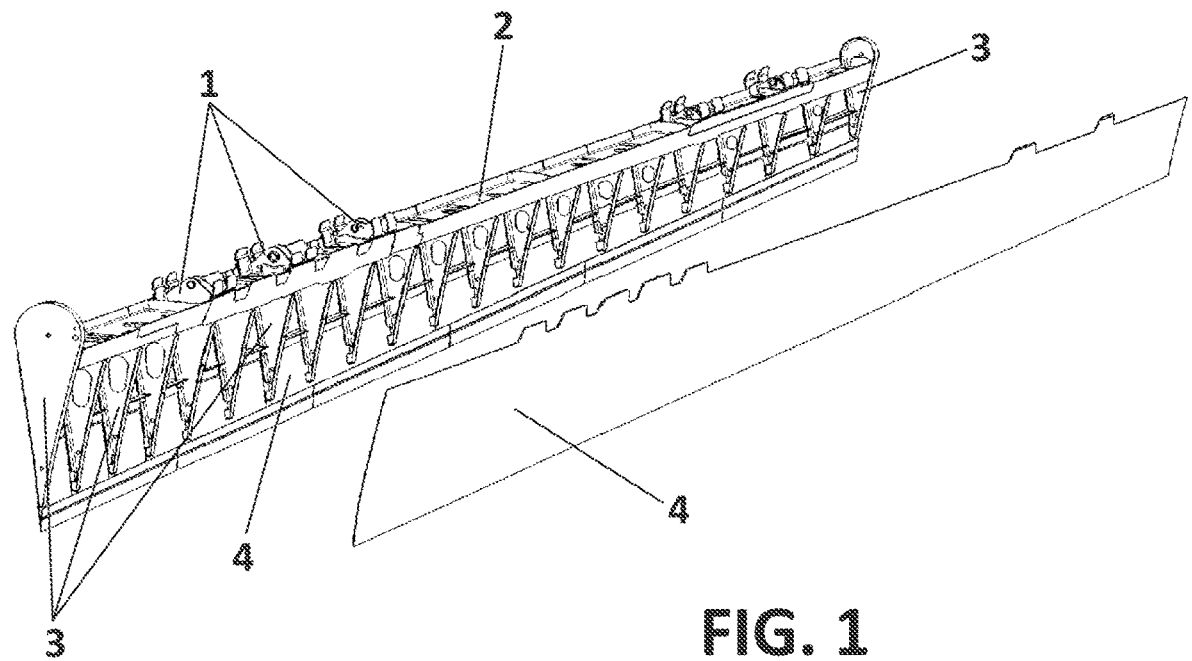
FIG. 1 schematically shows a structure of the control surface type of the state of the art which could be an aileron, a rudder, or an elevator.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DESCRIPTION OF PREFERRED EMBODIMENT(S) OF THE INVENTION

In view of the mentioned drawings, and according to the numbering used, the method of assembling hardpoints in mobile aeronautical structures of the invention can be seen therein.

More specifically, a representative drawing of the aforementioned already known structures, which have a specific number of hardpoints (1) having their holes aligned with a very narrow tolerance as a requirement can be seen in FIG. 1. Specifically, said FIG. 1 shows a longeron (2), ribs (3), skins (4), and the mentioned fittings or hardpoints (1), among others.

Figure 2:
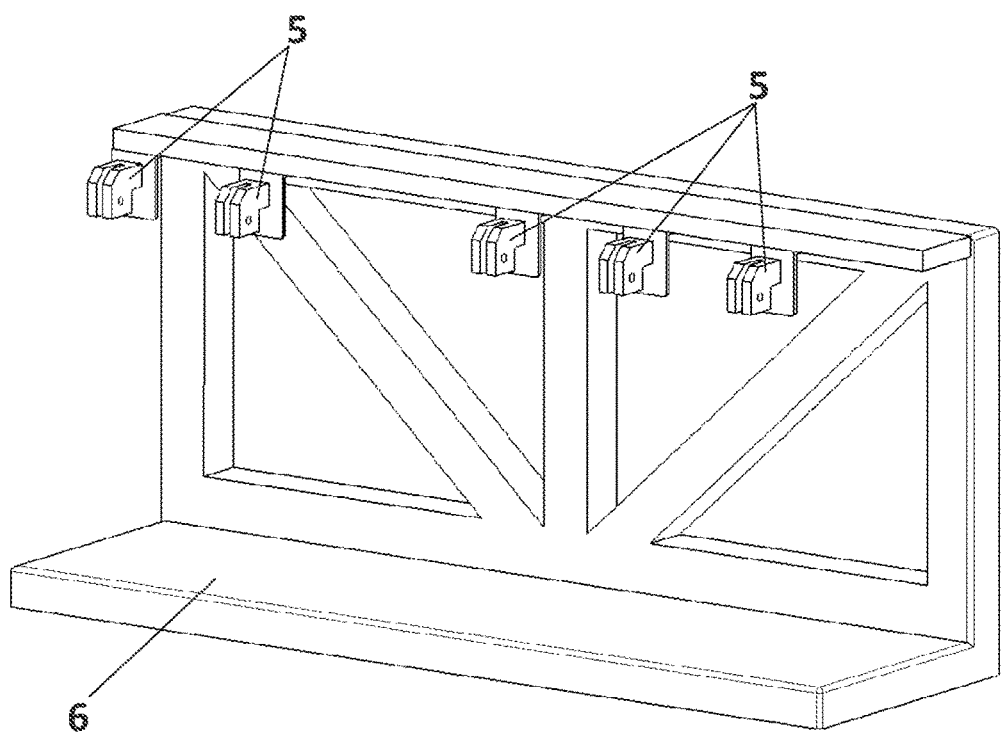
FIG. 2 schematically shows an assembly tool for assembling a structure of the control surface type shown in FIG. 1.

On the other hand, as can be seen in FIG. 2, the method of the invention needs a supporting structure which allows positioning the different parts or sub-assemblies making up the structure to be assembled for the correct assembly thereof, i.e., the assembly tool of the structure at hand which comprises:

positioning devices or positioning elements (5) for the hardpoints, where said positioning elements (5) allow restricting one or several degrees of freedom of a part or sub-assembly of parts such that the proper positioning thereof with respect to the others is assured;

an auxiliary structure (6) for supporting the assembly and the positioning elements (5) themselves in a sufficiently rigid manner.

And additionally the following elements:

laser collimator equipment (7) or a laser beam emitter, an adjustable support (8) for the laser collimator (7), at least one coaxiality sensor (9, 9') capable of detecting the incidence of the laser beam (7') on its surface and knowing its position with respect to a reference system in the device itself, i.e., a sensor which allows measuring the relative deviation of the laser beam emitted by the laser collimator (7) with respect to the coaxiality sensor (9, 9') itself.

These coaxiality sensors (9, 9') could be of two types according to two possible alternative embodiments of the invention. Specifically, one of such alternative embodiments will be one in which the coaxiality sensors (9) are translucent, i.e., they allow the laser beam (7') to pass through, in which case arranging sensors in all the holes of interest would be sufficient to obtain the measurements of each one of them simultaneously. The other alternative embodiment will be one in which the coaxiality sensors (9') are opaque, and in this case it is necessary to perform several steps of the method in a sequential manner since not all the measurements can be taken at the same time.

2-axis adjustable driven linear tables (10) which consist of supports with one or more linear guides or tracks which allow displacing an element with respect to another, that is, they specifically allow displacement in two perpendicular directions, and therefore on one plane.

mechanical actuators or devices (not depicted) the function of which is to provide force for moving the driven linear tables and which can be operated by hand or, for example, by an electric motor; and a computer system connected to both the coaxiality sensors and the actuators so as to interact with them and, through an interface, allow the user to perform the drive and direct the method and obtain information useful for the development of said method.

Figure 3:
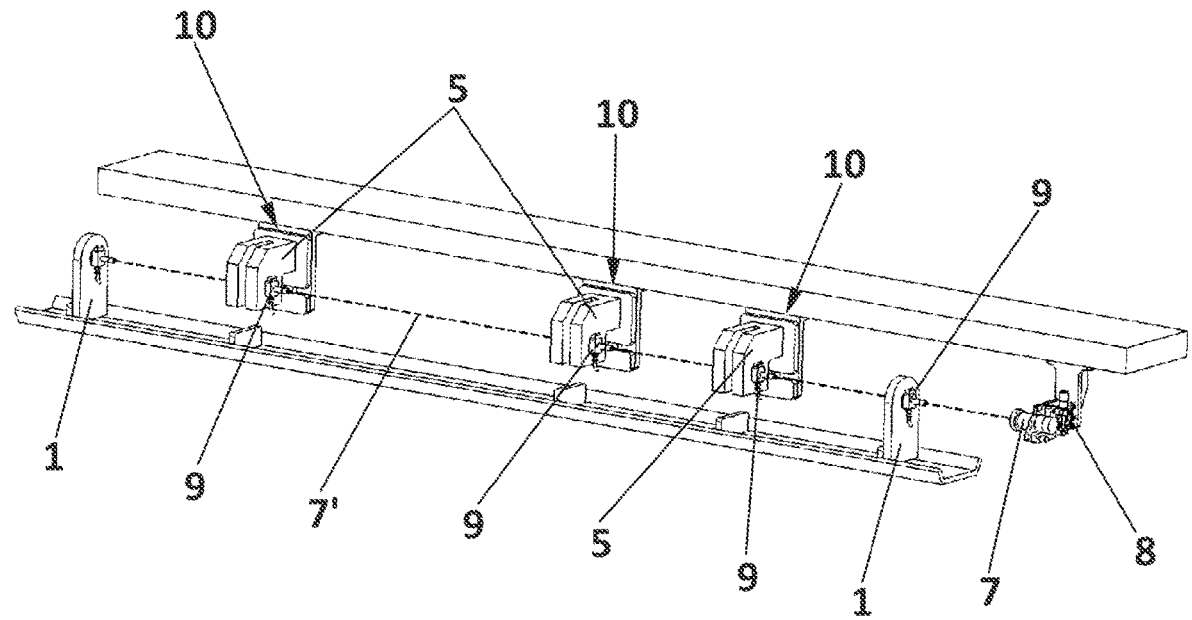
FIG. 3 shows a schematic perspective view of the main elements involved in the application of the method of assembly of the invention.

More specifically, as can particularly be seen in FIG. 3, the laser collimator (7) is assembled on an adjustable support (8) such that the emitted beam (7') goes through the holes of the hardpoints (1) previously installed in the structure. The actuators are connected to the driven linear tables (10) to provide said drive. These driven linear tables (10) are coupled to the positioning elements (5), thereby obtaining control over the movement thereof. Finally, the coaxiality sensors (9) are installed in the hardpoints (1) and in the positioning elements (5) such that the laser beam (7') strikes them and the deviation of said laser beam (7') with respect to the coaxiality sensors (9), and vice versa, can thereby be known.

Therefore, as a result of the preceding configuration the relative deviation of the hardpoints (1) and of the positioning elements (5) with respect to the laser beam (7') is known, and by using a correction algorithm, it is possible to know the displacement necessary for locating the positioning elements (5) such that they are aligned with respect to the hardpoints (1), said positioning elements (5) in turn being moved as a result of the movement of the driven linear tables (10), which comprise at least two driven portions, a horizontal driven portion (10') and a vertical driven portion (10"). Specifically, by means of the movement of the driven linear tables (10), in one or in several iterative steps, the positioning elements (5) are located until being aligned with the hardpoints (1), at which time the position thereof is fixed and they are ready for the rest of the hardpoints (1) to be assembled.

Figure 4:
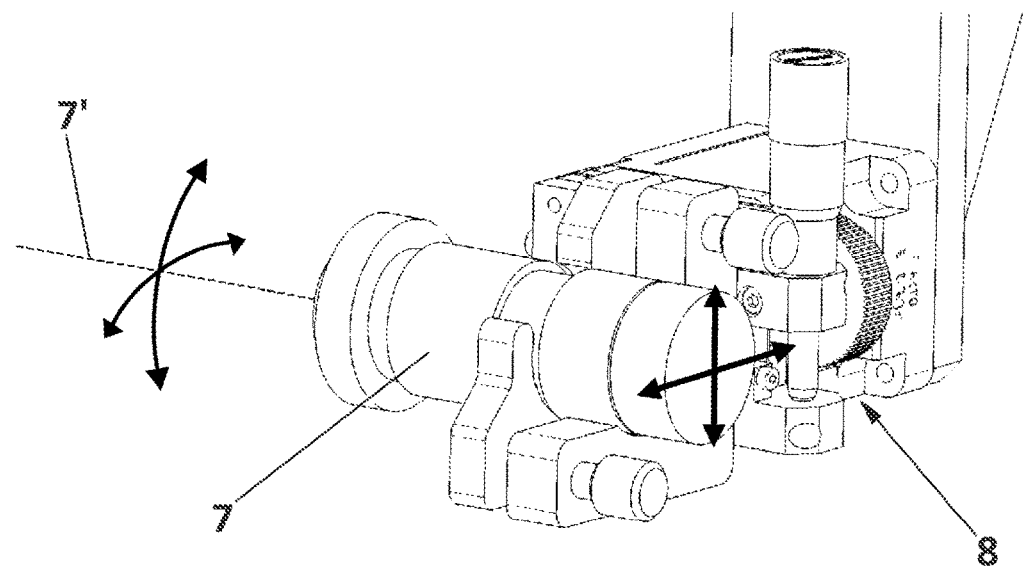
FIG. 4 shows a detail view of the support for the laser collimator for carrying out the method of the invention.

Therefore, according to a preferred embodiment, in order to carry out the assembly of a given product or structure once it is fixed on the auxiliary structure or support and is already equipped with two hardpoints assembled thereon, the steps comprised in the method of the invention according to the case in which translucent coaxiality sensors (9) are used are as follows:

1) INSTALLING AND ADJUSTING THE LASER COLLIMATOR (7). As can be seen in FIG. 4, in this step the laser collimator (7) is assembled in its adjustable support (8) and adjusted so that the laser beam (7') goes through the through holes with which the already installed hardpoints (1) and positioning elements (5) are equipped. It must be pointed out that it is not necessary for the laser beam (7') to go through the exact center of said holes, since it is sufficient for it to be within the reading range of the coaxiality sensor (9), which is usually several millimeters. As can be seen in said drawing, the adjustable support (8) is equipped with an adjustment such that it is possible to move it in at least two directions in space, for example horizontal and vertical, as well as to turn it horizontally and vertically for the purpose of orienting the laser beam (7') towards the coaxiality sensors (9).

Figure 5:
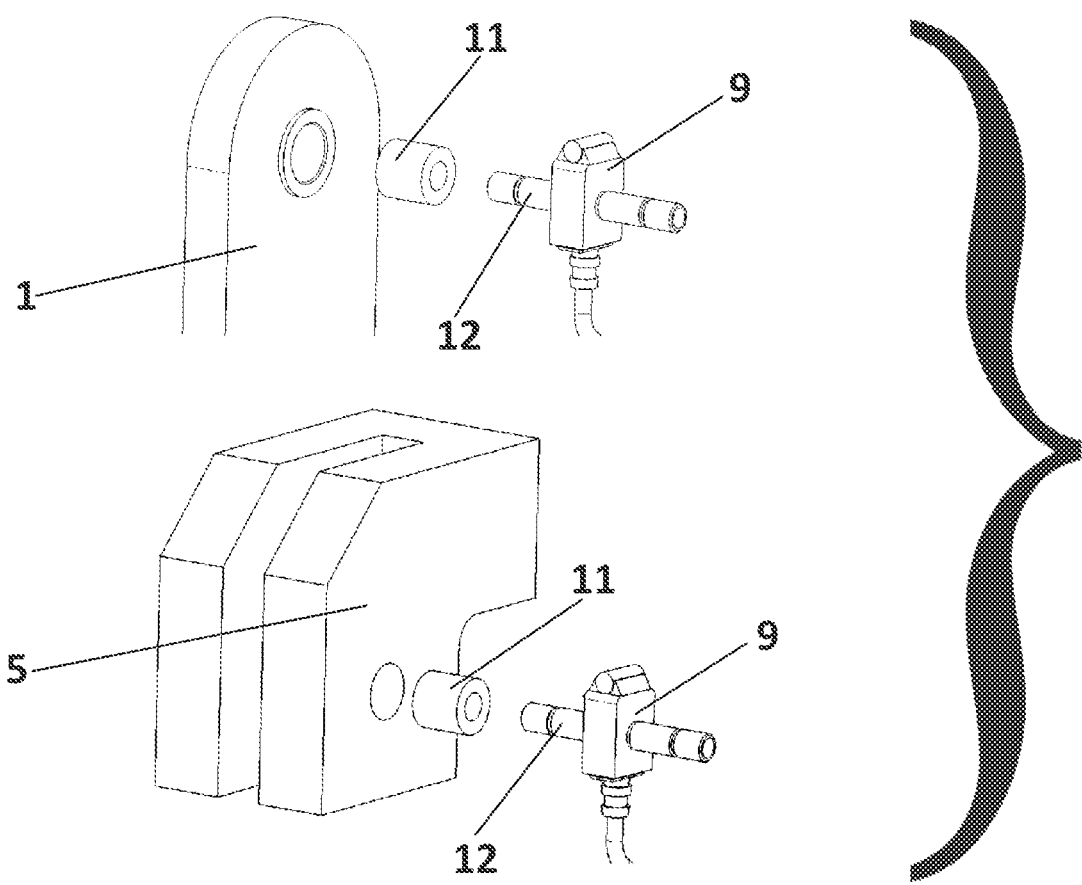
FIG. 5 shows several detail views of how the coaxiality sensor is coupled both to the hole of the hardpoints and to the hole of the positioning elements.

2) COUPLING THE COAXIALITY SENSORS (9). As can be seen in FIG. 5, the coaxiality sensors are coupled in the hole of the already installed hardpoints and of the positioning elements (5). More specifically, said drawing shows a detail of the coaxiality sensor (9) and how it is coupled by means of a built-in cylinder (12) and adapter sockets (11) to the hole of the hardpoints (1) and of the positioning elements (5).

Figure 6:
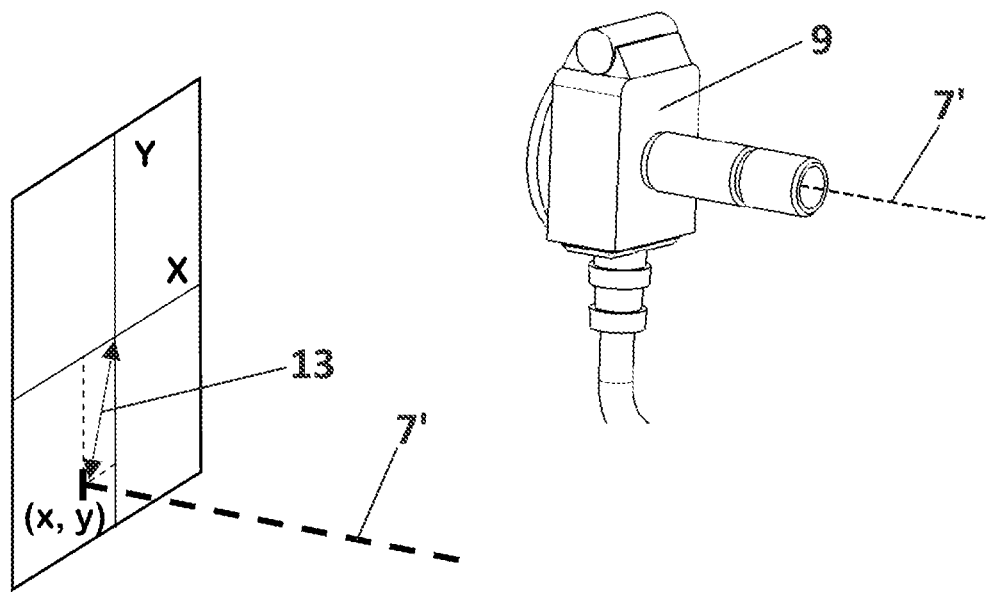
FIG. 6 shows a perspective view of how the laser beam strikes the coaxiality sensor and the schematic depiction of the deviation of said beam on the plane defined by said sensor.

3) MEASURING HARDPOINTS (1) AND POSITIONING ELEMENTS (5). As can be seen in FIG. 6, the laser beam (7') strikes the coaxiality sensors (9) located in the hardpoints (1) and in the positioning elements (5), showing their deviation (13) with respect to the local reference system of said coaxiality sensors (9).

4) CALCULATING THE DISPLACEMENT OF THE POSITIONING ELEMENTS (5). Once the deviations with respect to the laser beam (7') are known, the correction algorithm described in detail below is applied to calculate the necessary displacements to which the positioning elements (5) are to be subjected for proper alignment of the hardpoints (1).

Figure 7:
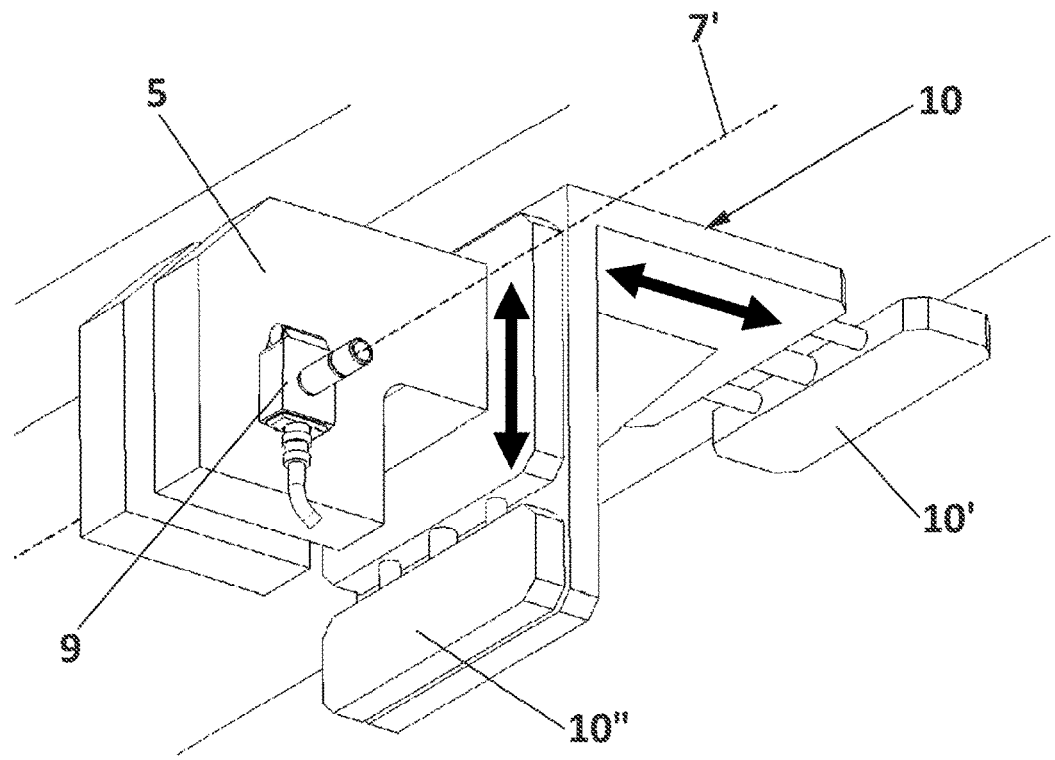
FIG. 7 shows a perspective view of a horizontal driven table and a vertical driven table, and of the movement said tables impart on their positioning element.

5) MOVING THE POSITIONING ELEMENTS (5). As shown in FIG. 7, the driven linear tables (10), and more specifically their horizontal driven portion (10') and their vertical driven portion (10"), perform displacements equivalent to those calculated in the preceding paragraph, resulting in the positioning element (5) being aligned.

6) CHECKING THE POSITIONING ELEMENTS (5). A new reading of the new position of the positioning elements (5) according to paragraph 3 above is taken, and in the event of being considered unsuitable, a new calculation of the displacement of the positioning elements (5) is performed by repeating steps 4 and 5.

7) FIXING THE POSITIONING ELEMENTS (5). Once it is checked that the alignment between hardpoints (1) and positioning elements (5) is good enough according to the established quality criterion, the position of the actuators and therefore of the positioning elements (5) is locked.

Figure 8:
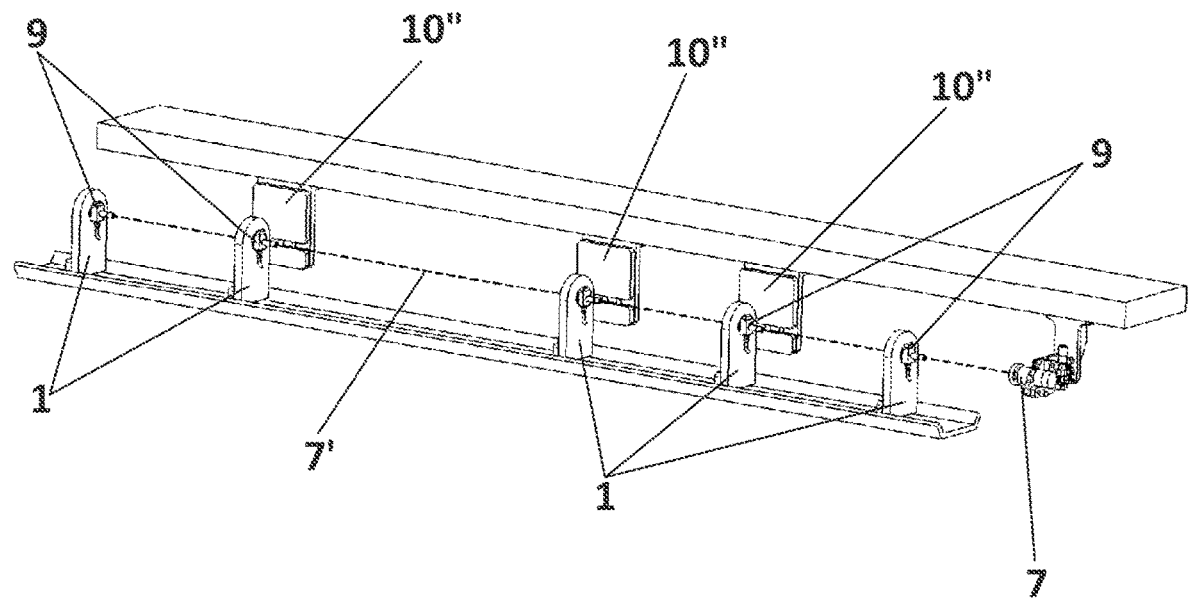
FIG. 8 shows a schematic perspective view of the measurement of the final position of the new hardpoints which have been assembled with the positioning elements (not depicted) so that they are aligned with the initial hardpoints.

8) ASSEMBLING THE REST OF THE HARDPOINTS (1). After that time, the coaxiality sensors (9) are disassembled and the rest of the hardpoints (1) are assembled to then also apply to same steps 2 to 7 of the described method; and finally, in an optional manner, 9) VERIFYING HARDPOINTS (1). As can be seen in FIG. 8, the present invention also allows verifying the final alignment of the hardpoints (1) with accuracy, for which purpose the coaxiality sensors (9) must simply be coupled to the hardpoints (1) with different adapter sockets (11) and the calculation must be performed in the same way as with the positioning elements (5). In other words, said drawing shows a scheme for measuring the final position of the new hardpoints (1) which have been assembled with the positioning elements (5) (not depicted) so that they are aligned with the initial hardpoints (1).

Figure 9:
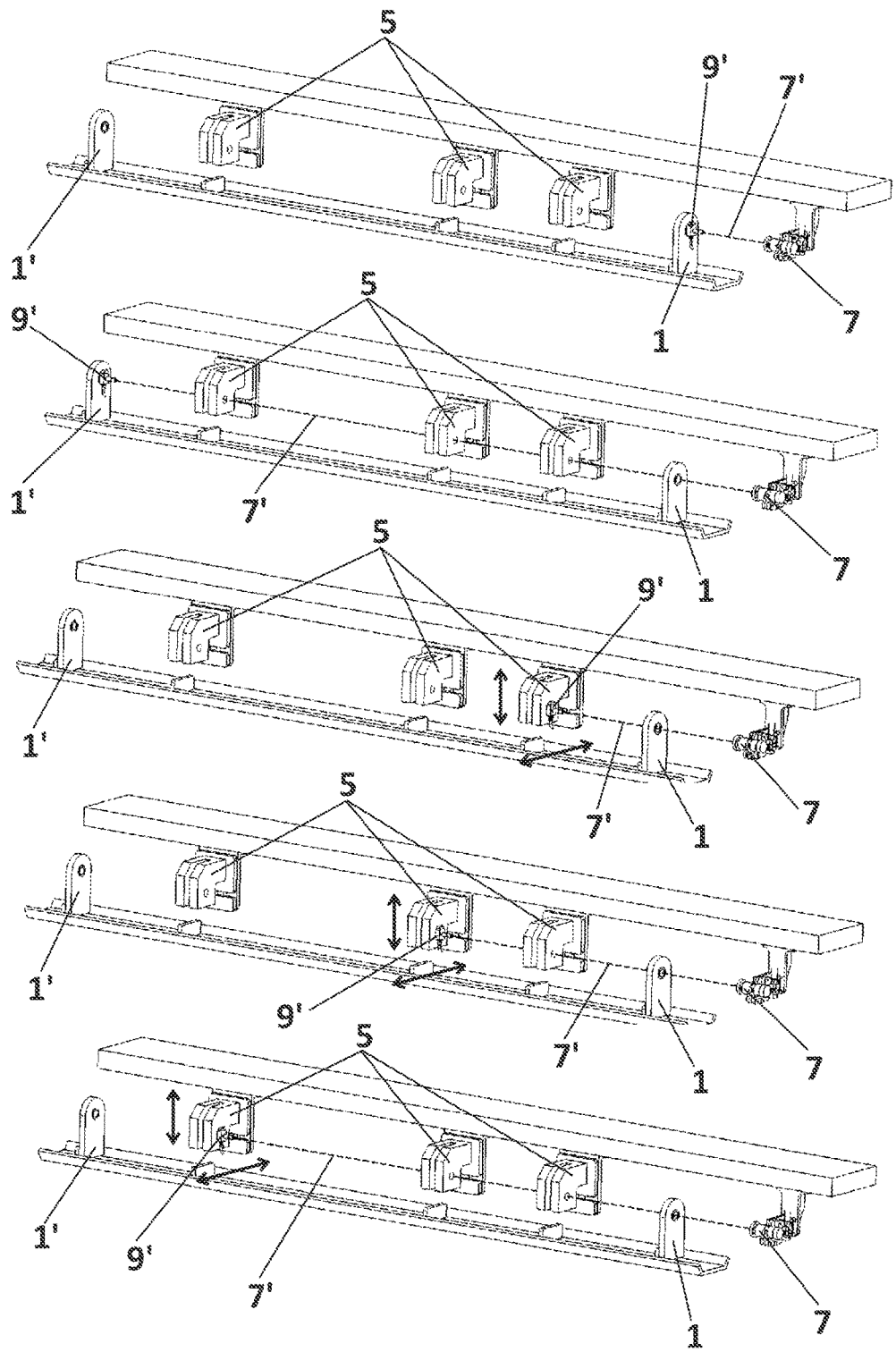
FIG. 9 shows various schematic perspective views of the steps to be taken according to the method of the invention for the case of using a single opaque coaxiality sensor in a sequential manner.

Finally, FIG. 9 shows an alternative embodiment of the method of the invention for the case in which a single opaque coaxiality sensor (9') is used in a sequential manner. Therefore, as can be seen, first the position of a hardpoint (1) located, for example, at one of the ends, is measured, and then the position of another hardpoint (1') located, for example, at the other end, is measured. After having established the position of both hardpoints (1, 1') with respect to the laser beam (7'), each of the positioning elements (5) is adjusted in a sequential manner.

Therefore, according to another possible embodiment, in order to carry out the assembly of a given product or structure once it is fixed on the auxiliary structure or support and is already equipped with two hardpoints assembled thereon, the steps comprised in the method of the invention according to the case in which opaque coaxiality sensors (9') are used are as follows:

a) Installing on the auxiliary structure (2) a laser collimator (7) on an adjustable support (8) which can be adjusted in at least two directions in space for the purpose of orienting the laser beam (7') so that it passes through a number of through holes with which two already installed hardpoints (1) are equipped;

b) Coupling a coaxiality sensor (9') in the through hole with which the first of the two already installed hardpoints (1) is equipped;

c) Measuring the deviation of the point where the laser beam (7') strikes the coaxiality sensor (9') located in the first hardpoint (1) with respect to a local reference system of said coaxiality sensor (9');

d) Coupling the coaxiality sensor (9') in the through hole with which the second of the two already installed hardpoints (1) is equipped;

e) Measuring the deviation of the point where the laser beam (7') strikes the coaxiality sensor (9') located in the second hardpoint (1) with respect to a local reference system of said coaxiality sensor (9');

f) Coupling the coaxiality sensor (9') in the through hole with which one of the positioning elements (5) is equipped;

g) Measuring the deviation of the point where the laser beam (7') strikes the positioning element (5) by obtaining its deviation (13) with respect to the local reference system of the coaxiality sensor (9, 9');

h) Once the deviations with respect to the laser beam (7') obtained in the preceding step are known, applying a correction algorithm to calculate the necessary displacements to which the positioning element (5) is to be subjected for proper alignment of the hardpoint (1) associated with it;

i) Shifting the positioning element (5) according to the value obtained in the preceding step, resulting in the positioning element (5) being aligned;

j) Taking a new reading of the position of the positioning element (5) according to paragraph g) above, and in the event of being considered unsuitable according to a previously established quality criterion, performing another calculation of the displacement of the positioning elements (5) by repeating steps h) and i);

k) Once it has been found that the alignment between the already installed hardpoints (1) and the positioning element (5) is sufficient according to the established quality criterion, locking the position of said positioning element (5);

l) Removing the coaxiality sensor (9') from the already aligned positioning element and repeating steps f) to k) for the rest of the positioning elements (5);

m) Assembling the rest of the hardpoints (1) to then also sequentially apply to same the preceding steps b) to l) of the described method; and in an optional manner, n) Verifying the final alignment of all the already installed hardpoints (1) by coupling the coaxiality sensor (9') in a sequential manner directly to the hardpoints (1) and performing the calculation of the deviation in the same way as with the positioning elements (5).

Below, as indicated in the steps of the methods described above, FIGS. 10 to 13 describe an example of a correction algorithm to calculate the necessary displacements to which the positioning elements (5) are to be subjected for proper alignment of the hardpoints (1).

Figure 10:
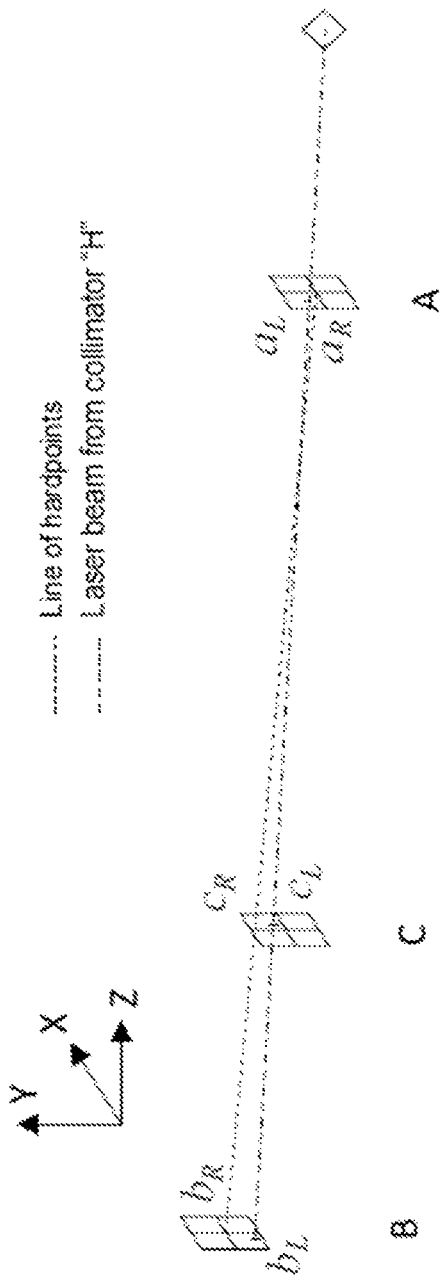
FIG. 10 shows a schematic drawing of the mathematical demonstration of the calculation of displacements for the example in which there are already installed hardpoints A and B and a hardpoint C is to be aligned.

Therefore, FIG. 10 shows hardpoints A, B, and C, where A and B are previously installed and C is the hardpoint to be aligned. Points $a_R$, $b_R$, and $c_R$, which are the centers of the sensors coupled to the mentioned hardpoints, and also points $a_L$, $b_L$, and $c_L$, which are the points where the laser beam strikes each sensor, are likewise shown. Finally, the global reference system $\{A, X, Y, Z\}$ that is used is shown.

More specifically, there are two previously installed hardpoints (1) "A" and "B", with respective installed sensors the central points of which are "$a_R$" and "$b_R$"; a positioning element (5) of the hardpoint C to be installed such that it is aligned with "A" and "B" with an installed sensor the central point of which is "$c_R$"; a fictitious line "R" defined by points "$a_R$" and "$b_R$"; a laser beam "L" coming from the laser collimator (7) which strikes the sensors of the three hardpoints at points "$a_L$", "$b_L$," and "$c_L$"; a global reference system S=$\{A, X, Y, Z\}$ the origin of which is "A", the axis "Z" of which is parallel to the fictitious line "R" and the axes "X" and "Y" of which are parallel to the local axes of each sensor "x" and "y", respectively.

The distances in direction "Z" are very large compared to the deviations in "X" and "Y", so the working hypothesis is that the angle between line "R" and line "L" is very small. This means that small variations in direction "Z" will not cause significant variations in "X" and in "Y".

Figure 11:
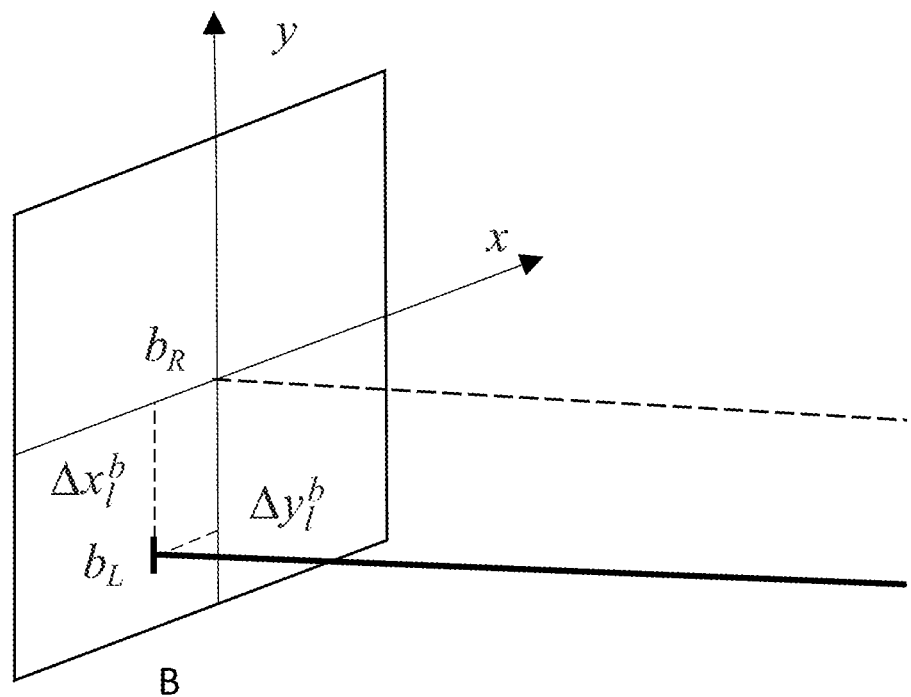
FIG. 11 schematically shows a detail of the incidence of the laser on the sensor of hardpoint B for the case of FIG. 10 above.

On the other hand, FIG. 11 shows the detail of the incidence of the laser on the sensor of hardpoint B, which is valid for any other hardpoint. It is shown how the coordinates of the points of incidence of the laser "$a_L$", "$b_L$," and "$c_L$" are obtained from the readings of the sensors and theoretical "Z".

More specifically, each of the sensors coupled to the hardpoints will provide a reading of the coordinates of the point of incidence of the laser in the local reference system of each sensor $\Delta x_l$ and $\Delta y_l$ which coincide, under the hypotheses considered, with coordinates "X" and "Y" in the global reference system. Coordinate "Z" is not precisely known such that under the hypotheses considered above, theoretical "Z" can take "$z_t$" without causing significant variations in "x" or in "y". The coordinates of the points of incidence of the laser on each of the sensors "$a_L$", "$b_L$", "$c_L$", in the reference system "S" are thereby known. They are known specifically from the expression:

$$a_L = (\Delta x_l^a, \Delta y_l^a, z_t^a)$$

$$b_L = (\Delta x_l^b, \Delta y_l^b, z_t^b)$$

$$c_L = (\Delta x_l^c, \Delta y_l^c, z_t^c)$$

where $\Delta x_l^a$ and $\Delta y_l^a$ are the deviations measured by the sensor coupled to hardpoint A and $z_t^a$ is the theoretical coordinate z of hardpoint A; where $\Delta x_l^b$ and $\Delta y_l^b$ are the deviations measured by the sensor coupled to hardpoint B and $z_t^b$ is the theoretical coordinate z of hardpoint B; and where $\Delta x_l^c$ and $\Delta y_l^c$ are the deviations measured by the sensor coupled to hardpoint C and $z_t^c$ is the theoretical coordinate z of hardpoint C.

Therefore, by using the coordinates of the points of incidence of the laser "$a_L$", "$b_L$," line "L" is calculated using the so-called equations of a line, which are equations which mathematically represent all the points making up a line, in this case the points making up the laser beam. In that sense:

$$L = \left\{ \begin{array}{l} X = mZ + n \\ Y = m'Z + n' \end{array} \right\}$$

$$m = \frac{\Delta x_l^a - \Delta x_l^b}{z_t^a - z_t^b}; \quad n = \Delta x_l^a - \frac{\Delta x_l^a - \Delta x_l^b}{z_t^a - z_t^b} z_t^a = \Delta x_l^b - \frac{\Delta x_l^a - \Delta x_l^b}{z_t^a - z_t^b} z_t^b$$

$$m' = \frac{\Delta y_l^a - \Delta y_l^b}{z_t^a - z_t^b}; \quad n' = \Delta y_l^a - \frac{\Delta y_l^a - \Delta y_l^b}{z_t^a - z_t^b} z_t^a = \Delta y_l^b - \frac{\Delta y_l^a - \Delta y_l^b}{z_t^a - z_t^b} z_t^b$$

where m and m' are the slopes (inclination) of line L with respect to planes YZ and XZ, respectively;
where n and n' are coordinates "x" and "y", respectively, of the point of intersection of line L with plane XY; and
where X, Y, and Z are the coordinates of any one point belonging to line L.

Figure 12:
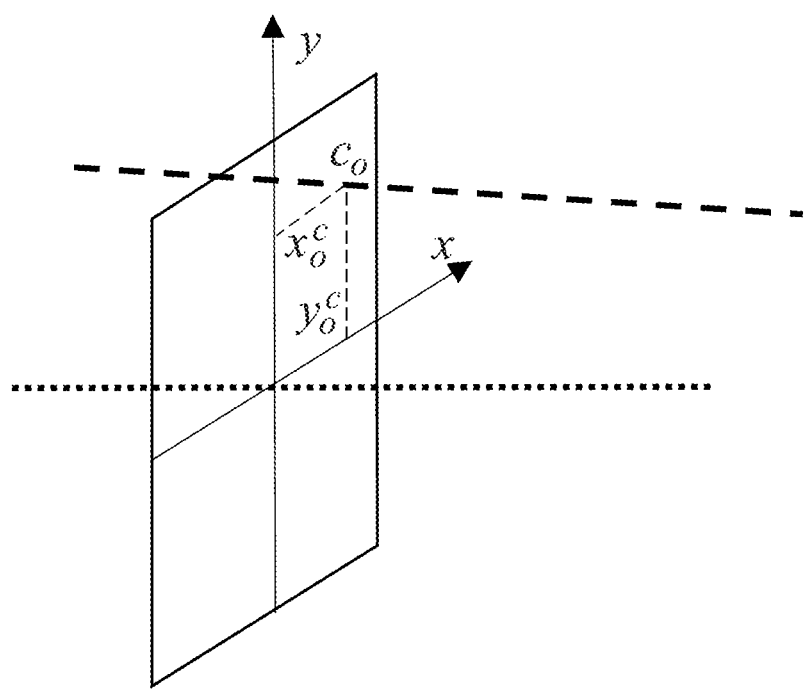
FIG. 12 schematically shows a detail of the incidence of the laser in the sensor located in positioning element "C" when the latter is aligned with hardpoints "A" and "B" of FIGS. 10 and 11 above.

Therefore, as can be seen in FIG. 12, which shows a sketch of the laser beam striking the sensor of positioning element "C" when it is aligned with hardpoints "A" and "B", with the equation of the line of the laser beam "L" being known, coordinates "X" and "Y" of point "$c_o$" are calculated by substituting therein theoretical coordinate "Z" of hardpoint "C". In that sense:

$$c_o = (x_o^c, y_o^c, z_o^c)$$

$$x_o^c = m \cdot z_t^c + n$$

$$y_o^c = m' \cdot z_t^c + n'$$

$$z_o^c = z_t^c$$

where $z_t^c$ is theoretical coordinate z of hardpoint C.

And where point "$c_o$" is the point of the sensor on which the laser must strike when the positioning element of hardpoint "C" is aligned with hardpoints "A" and "B", so it is referred to as the target point. It should be observed that the laser beam does not have to be aimed at the center of the sensor of positioning element "C"; this only occurs when the laser beam has been positioned such that it also goes through the exact center of the sensors of hardpoints "A" and "B".

Figure 13:
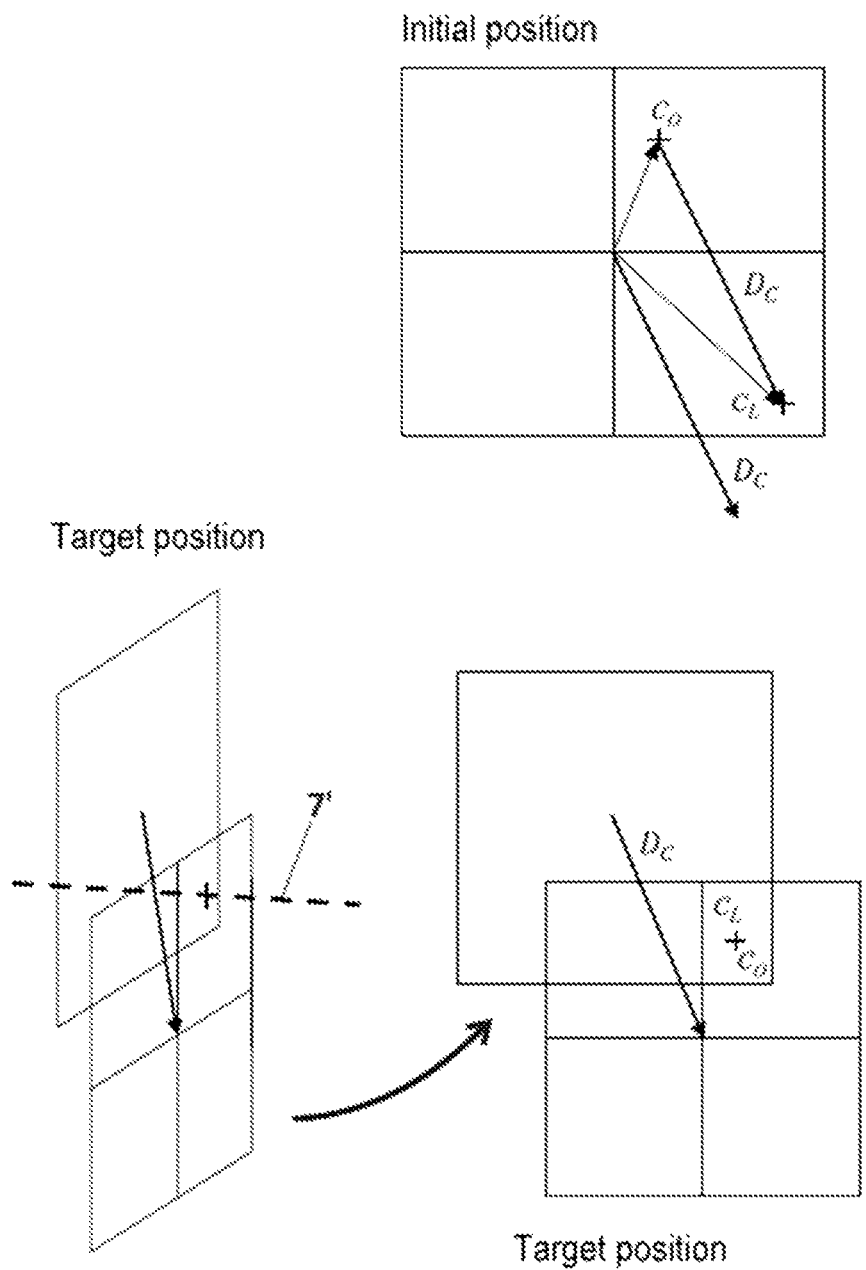
FIG. 13 shows several schematic views of the geometric calculation of the displacement vector.

Finally, as can be seen, FIG. 13 shows a sketch of the displacement vector which gets the beam to successfully go from striking "$c_L$" to "$c_o$". Specifically, FIG. 13.1 geometrically demonstrates how the displacement vector is calculated; FIG. 13.2 shows the sensor of positioning element "C" in the initial position which is displaced to the target position of FIG. 13.3, i.e., the position in which positioning element "C" is aligned with hardpoints "A" and "B".

In other words, once the initial point of incidence of laser "$c_L$" is known, displacement vector "$D_C$" which the positioning element must be moved for the point of incidence to be "$c_o$" is calculated. In that sense:

$$D_C = c_L - c_o = (x_D^c, y_D^c)$$

$$x_D^c = \Delta x_L^c - x_o^c$$

$$y_D^c = \Delta y_L^c - y_o^c$$

where $x_D^c$ is the theoretical displacement that must be applied to positioning element C to align it with A and B by means of the mentioned horizontal driven portion (10') of the driven linear tables (10); and where $y_D^c$ is the theoretical displacement that must be applied to positioning element C to align it with A and B by means of the mentioned vertical driven portion (10") of the driven linear tables (10).

Although the present invention has been described with reference to preferred embodiments, workers skilled in the art will recognize that changes may be made in form and detail without departing from the spirit and scope of the invention.

The invention claimed is:

1. A method involving placement of an aeronautical structure which already has two hardpoints installed on an auxiliary structure, where said auxiliary structure in turn includes a set of positioning elements which allow varying their position according to at least one degree of freedom, the method comprising the steps of:
   a) installing on the auxiliary structure a laser collimator on an adjustable support which can be adjusted in at least two directions in space for orienting a laser beam from the laser collimator so that the laser beam passes through a number of through holes with which the two already installed hardpoints are equipped;
   b) coupling an opaque coaxiality sensor in a first of the through holes with which the first of the two already installed hardpoints is equipped;
   c) measuring a deviation of a point where the laser beam strikes the coaxiality sensor located in the first of the two already installed hardpoints with respect to a local reference system of said coaxiality sensor;
   d) coupling the coaxiality sensor in a second of the through holes with which the second of the two already installed hardpoints is equipped;
   e) measuring a deviation of the point where the laser beam strikes the coaxiality sensor located in the second of the two already installed hardpoints with respect to a local reference system of said coaxiality sensor;

f) coupling the coaxiality sensor in one of the through holes with which one of the set of positioning elements is equipped;

g) measuring a deviation of the point where the laser beam strikes a corresponding positioning element of the set of positioning elements by obtaining its deviation with respect to the local reference system of the coaxiality sensor;

h) once the deviations with respect to the laser beam obtained in the preceding step are known, applying a correction algorithm to calculate necessary displacements to which the positioning element is to be subjected for proper alignment of the hardpoint associated with the corresponding positioning element;

i) shifting the positioning element according to a displacement value obtained in the preceding step, resulting in the positioning element being aligned;

j) taking a new reading of the position of the corresponding positioning element according to step g) above, and in the event of being considered unsuitable according to a previously established quality criterion, performing another calculation of the displacement of the set of positioning elements by repeating steps h) and i);

k) once it has been found that the alignment between the two already installed hardpoints and the corresponding positioning element is sufficient according to the previously established quality criterion, locking the position of said corresponding positioning element;

l) removing the coaxiality sensor from the already aligned positioning element and repeating steps f) to k) for the rest of the set of positioning elements; and m) assembling the rest of the hardpoints to which the preceding steps b) to l) of the method are then performed.

2. The method according to claim 1, and further comprising the additional step of:

n) verifying a final alignment of all the already installed hardpoints by coupling the opaque coaxiality sensor in a sequential manner directly to the hardpoints and performing the calculation of the deviation in the same way as with the set of positioning elements.

3. The method according to claim 1, wherein the correction algorithm to calculate the necessary displacements to which the positioning elements are to be subjected for proper alignment of the hardpoints comprises:

calculating a line R going through central points of the installed coaxiality sensor;

calculating a line L going through points of incidence of the laser beam on the coaxiality sensor;

using both lines R and L, calculating coordinates of a target point of the coaxiality sensor where the laser beam must strike when the positioning element of the hardpoint to be aligned is aligned with the two already installed hardpoints; and calculating a displacement vector that the positioning element must be moved so that the point of incidence is the target point.

4. The method according to claim 1, wherein the displacement of the set of positioning elements according to step e) is performed using driven linear tables comprising a horizontal driven portion and a vertical driven portion.

* * * * *